April 7, 1959
C. H. NEHLS
2,880,903
LOCKING CAP AND IMPROVED GASKET THEREFOR
Filed July 22, 1957
2 Sheets-Sheet 1
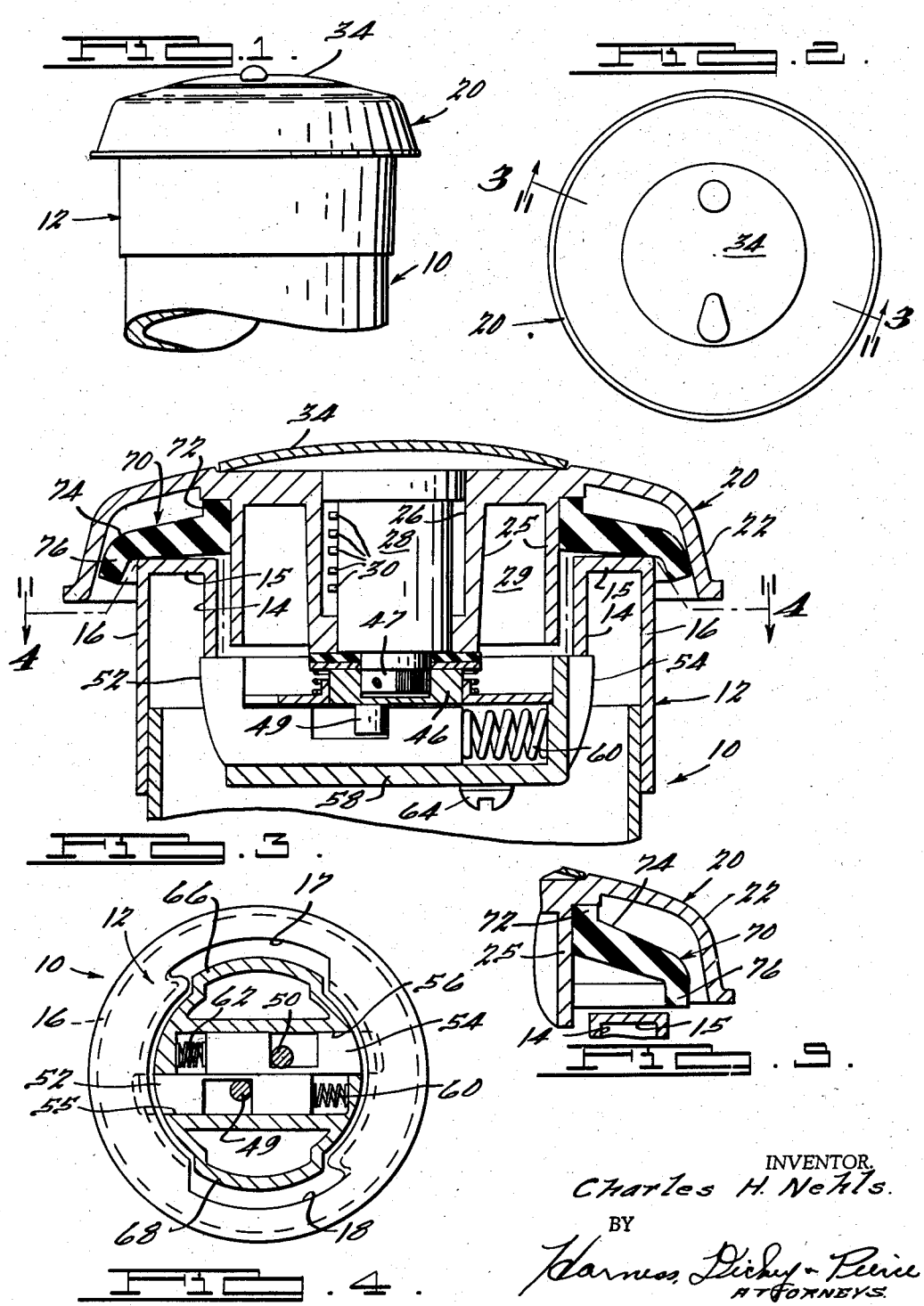
INVENTOR.
Charles H. Nehls.
BY
Harness, Dickey - Pierce
ATTORNEYS.

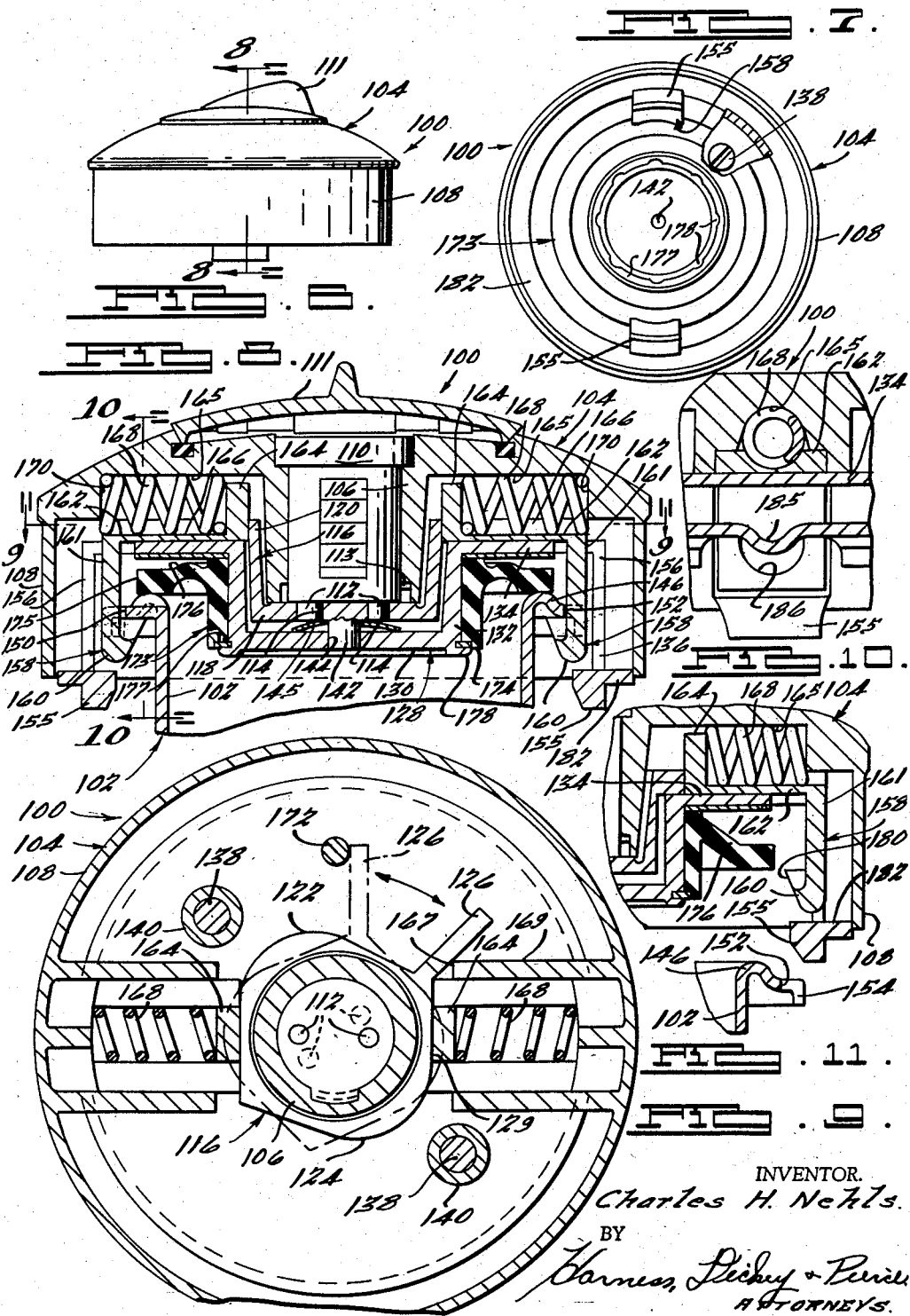

United States Patent Office 2,880,903
Patented Apr. 7, 1959

2,880,903

LOCKING CAP AND IMPROVED GASKET THEREFOR

Charles H. Nehls, Detroit, Mich.

Application July 22, 1957, Serial No. 673,456

5 Claims. (Cl. 220—46)

This application is a continuation-in-part of my co-pending applications, Serial Nos. 500,765, filed April 12, 1955, and 623,646, filed November 21, 1956 (now abandoned, and entitled, respectively, "Locking Cover" and "Locking Cap and Improved Gasket Therefor."

This invention relates to improved locking type caps for automobile fuel tank filler necks and the like, and more particularly to such caps including improved spring acting, biasing and sealing gaskets.

It has become common, in the construction of automobiles, to locate the gasoline filler neck and cap in a relatively confined recess in the car body, and to construct the neck with a flange for engagement with the holding parts of a conventional, non-locking cap. The recess is also frequently covered by a door or by a hinge mounted license plate, which limits the permissible extension of the filler neck cap beyond the neck itself. When a locking cap is employed, it is, of course, necessary to manipulate the key as well as to turn the cap itself, and this ordinarily necessitates the use of both hands within the recess. Not only is this difficult in such a confined space, but where the locking mechanism must engage an external flange, it has been found difficult to encompass the necessary mechanism within a cap structure small enough to provide clearance between the cap and the walls of the recess, to provide room for the hand and fingers to grasp the exterior of the cap and permit removal thereof.

Not only must such locking caps fit within the confined spaces available around fuel tank filler necks in modern automobiles, but also they must seat themselves securely on the filler necks and must not rattle while in use. Some sort of spring bias is usually necessary to maintain the locking latches in engagement against the flange of the filler neck and to constantly urge the cap away from the filler neck to prevent rattling. It is increasingly difficult to provide such a spring bias arrangement in those instances where the permissible axial and/or radial projection of the cap from the end of the filler neck is limited.

Accordingly, one important object of the present invention is to provide improved locking caps for automobile fuel tank filler necks and the like, which may be readily fitted and manipulated within relatively confined spaces.

Another object is to provide an improved unitary non-metallic combined biasing spring and sealing gasket member having operating characteristics superior to those which it has been possible to achieve heretofore without materially exceeding the size and/or cost of my improved device.

The invention will now be described in greater detail in connection with the accompanying drawings of which:

Figure 1 is an elevational view of an improved automobile tank filler neck locking cap according to one embodiment of the invention showing the locking cap in place on a typical filler neck of the type having an internal flange;

Fig. 2 is a plan view of the locking cap shown in Fig. 1;

Fig. 3 is a cross-sectional view of the locking cap as shown in Fig. 2, taken along the section line 3—3 thereof;

Fig. 4 is a cross-sectional view of the locking cap as shown in Fig. 3, taken along the section line 4—4 thereof;

Fig. 5 is a fragmentary cross-sectional view of the locking cap shown in the preceding figures, being generally similar to the view of Fig. 3 but showing the locking cap removed from the filler neck;

Fig. 6 is a side elevational view of a locking cap according to a second embodiment of the present invention;

Fig. 7 is a bottom view of the locking cap shown in Fig. 6, portions of the cap being broken away to show the internal structure thereof;

Fig. 8 is a cross section on a somewhat enlarged scale, taken substantially on the section line 8—8 of Fig. 6 and looking in the direction of the arrows, showing the cap locked in position upon a fragmentarily illustrated filler neck of the type having an outwardly projecting flange;

Fig. 9 is a horizontal section of the cap shown in Figs. 6–8, the view being taken substantially along the section line 9—9 of Fig. 8;

Fig. 10 is a fragmentary cross-sectional view of the locking cap as shown in Fig. 8, being taken along the section line 10—10 thereof; and Fig. 11 is a fragmentary cross-sectional view of the cap as shown in Fig. 8, the view being generally similar to the view of Fig. 8 but showing the cap detached from the filler neck with the latch bolts retracted.

Referring first to Figs. 1 to 5 of the drawings, a neck 10 of a receptacle (not shown) is illustrated therein, which may be considered to be the filler neck of an automobile fuel tank, although it will be understood that the invention is applicable to other uses. The neck 10 as shown is provided at its outer end with a return-bent internal flange 14 formed upon a return-bent, substantially U-sectioned finishing ring 12, the outer cylindrical flange 16 of which is secured to the neck and is connected to the inner flange 14 by the flat top web portion 15. The internal flange 14 and the web 15 are partially cut away at diametrically opposite portions 17 and 18. Such cut-away portions have inclined downturned margins and are of a form commonly provided on automobile fuel tank filler necks to permit the application of a cap of the bayonet locking type, although the cap of the present invention is not of the bayonet locking type, such neck construction being shown only in order to illustrate the applicability of the improved cap thereto.

A locking cap according to a first embodiment of the invention is seated on the filler neck 10 and includes a body 20, which may be formed as an integral die casting, and which is provided with a downwardly extending skirt portion 22 spacedly overhanging the neck. The outer surface of the body 20 is preferably attractively finished as by chromium plating to improve the appearance of the cap. A centrally disposed plug portion 25 is formed integrally with the body 20 and extends downwardly therefrom. A lock cylinder 26 is formed within the plug portion 25 and adapted to accommodate a lock plug 28. An annular groove 29 may also be provided in the plug portion 25 extending partially therearound so as to reduce the weight of the cap. The lock plug 28 includes conventional spring-biased plate tumblers 30 which normally project into diametrically opposed, longitudinally extending grooves (not separately designated) formed in the inner wall of the cylinder 26. The tumblers 30 have apertures therein through which a key (not shown) passes to retract the tumblers from the grooves, after which the plug 28 is rotatable in the cylinder 26.

in the conventional manner. The upper key-receiving end of the lock plug 28 may be exposed, but is preferably covered by a movable dust cover 34, the construction of which may be varied as desired.

A pair of latch bolts 52 and 54 are mounted beneath the central plug portion 25 of the latching cap within a pair of slideways 55 and 56 formed in a lower housing 58. The latch bolts 52 and 54 are urged radially outwardly in opposite directions by compression springs 60 and 62, respectively, which normally project the bolts outwardly through openings in the sides of the housing 58. Thus, when the cap is positioned upon a filler neck the bolts 52 and 54 underlie the filler neck flange portion 14 to prevent removal of the cap.

The construction of the lower housing 58 and the interconnecting parts between the lock plug 28 and the latch bolts 52 and 54 may be generally similar to the construction described and claimed in my U.S. Patent No. 2,796,-192. It is sufficient to point out here that the latch bolts 52 and 54 are actuatable for retraction against their spring biasing by a pair of off-center pins 49 and 50, respectively, mounted on the lower end of a cup 46. The cup 46 is keyed to the lock plug 28 for rotation therewith by means of a shaped lug 47 which extends downwardly from the plug 28 and is fittingly engaged within an aperture (not separately designated) in the cup 46. The latch bolts 52 and 54 are thus simultaneously retractable by rotation of the cup 46 in response to rotation of the lock plug 28 to permit removal of the cap.

The lower housing 58 is secured to the downwardly extending plug portion 25 of the cap by screws 64 or any other desired means, the housing 58 and the plug portion 25 being fastened together in alignment to form a substantially cylindrical, downwardly extending, central section which projects into the filler neck. The housing 58 is also provided with radial bosses 66 and 68 adapted to extend into the cut-out areas 17 and 18 of the flange 14. The bosses 66 and 68 key the cap against rotation with respect to the filler neck and thus insure proper positioning of the cap upon the filler neck in such a manner that the bolts will engage the portions of the flange 14 between the cutout areas 17 and 18.

A unitary gasket-spring element 70 according to the present invention is housed within the skirt portion 22 of the cap and serves the three-fold purpose of preventing the escape of fuel around the periphery of the cap, of taking up clearances and preventing rattles by biasing the cap away from the filler neck to keep the latch bolts 52 and 54 in pressure engagement against the flange 14, and of assisting in the removal of the cap by pushing it upwardly as soon as the bolts are retracted, thereby preventing reprojection of the bolts by moving them into engagement with the smooth inner surface of the inner finishing ring flange 14.

The element 70 is formed of a resilient, elastic material such as neoprene or other rubber-like composition which is substantially unaffected by the fuel or other material to be stored in the tank. Its cross-sectional contour is best shown in Figs. 3 and 5, and is such as to provide both tight sealing and highly effective spring biasing action with a cap construction which is relatively short axially. The biasing action, which will be considered in detail hereinafter, is such as to provide a relatively long spring travel despite the extremely compact character of the cap.

The element 70 includes an inner sleeve portion 72 which fits snugly around the central plug portion 25 of the cap and holds itself in position thereon, an outer depending ring, or flange portion 76 having an inner diameter at least as great as the outer diameter of the filler neck flange 12, and an intermediate conical portion 74 formed integrally with and extending between the sleeve portion 72 and the ring portion 76. In the present embodiment, the conical portion 74 engages and seals against the finishing ring flange 15, but its resistance to bending is not sufficient by itself to provide adequate spring biasing. An integral outer rim portion 76 is formed upon the conical web 74 and is proportioned to extend downwardly around the filler neck, and to fit easily over the neck as the cap is applied.

When the cap is pushed down on the filler neck to the latched position shown in Fig. 3, the finishing ring 15 engages the conical portion 74 of the gasket 70 and deflects it upwardly with respect to the sleeve portion 72. Upward deflection of the conical portion 74 tends to flare it outwardly and to increase its outer diameter, but such increase is resisted by the resilience of the outer rim portion 76, which is stretched and placed under tension by the deflection of the conical portion 74. Radially outward force is exerted upon the rim 76 by the conical portion 74 when the cap is pressed on the filler neck, stretching the rim and placing it under tension. The rim 76 being resilient, reacts compressively on the conical portion 74, urging it back toward its undeflected form and contributing substantially to the sealing pressure and to the spring biasing of the cap away from the filler neck. The rim portion 76 thus effectively increases the spring action of the element. It will be appreciated that as the rim is stretched nearly to its limit by the expansive effort exerted thereupon by the expanding cone portion, the resistance of the rim increases to a maximum. This not only tends to pull the latch bolts up firmly against the bottom of flange 14 to take up clearances and prevent rattles, but when the bolts are retracted, imparts a quick, sharp lifting action to the entire cap, insuring that the bolts will not again be returned to an unwanted underengaged locked position. The tendency of the cone and rim to thereafter fully relax to their normal proportioning shown in Fig. 5 exerts less than the initial lifting force but does provide a smooth and substantial lifting action, throughout a substantial travel, and this will be recognized as helpful in tending to maintain an effective seal at all times.

The resistance of the conical portion 74 to lateral bending (diaphragm-type of bending), and its resistance to radial inward distortion in its conic plane, can be increased by the incorporation of a tapered cross section, which is shown as of increasing thickness toward its supported, inner periphery. Variation of the thickness of the rim 76, and of the thickness and taper of the conical portion 74, permit the designer to achieve a proper and highly effective spring action within the limited permissible size and axial travel of the cap, while still utilizing a rubber-like material having such characteristics (e.g. durometer rating) as to provide an efficient sealing gasketing action between the under surface and the filler neck.

The axial travel of the cap on the filler neck must also be sufficient to permit moving the cap downwardly sufficiently to release the friction on the latch bolts, and this travel is provided for, despite the extremely compact nature and short axial dimensions of the cap, by a slight additional clearance between the outer edge of the ring 76 and the inner surface of the skirt portion 22 of the cap. When it is desired to unlock the cap, the key is first inserted in the lock plug 28, the cap is pressed downwardly slightly upon the filler neck, and the key may then be readily turned to withdraw the latch bolts.

In the preferred construction shown, the axial dimension of the rim portion 76 is greater than its radial dimension in order to minimize the diameter of the cap, while the extent to which the cap projects axially beyond the filler neck is minimized by the arrangement of the rim portion to project downwardly from the conical portion 74, around the neck in the space between the neck and skirt 22. The extent to which the rim thus projects downwardly can also be varied to change the effective spring action of the rim without requiring any increase in the dimensions of the cap.

The locking cap according to this first embodiment of the invention is extremely compact, both with respect to its length and its diameter, and may be fitted and operated within relatively confined spaces, such as are found around the filler necks of increasing numbers of modern automobiles.

Referring now to Figs. 6–11, wherein there is illustrated a locking cap 100 according to a second embodiment of the invention adapted for closing a filler neck 102 having an outwardly projecting flange, the reference character 104 designates generally the body of the cap, which is of bell shape and the exact contouring of which is subject to variation, as will be appreciated. A hollow cylindrical boss 106 is formed integrally with the cap body 104, and projects axially downwardly within and is surrounded by the skirt portion 108 of the body 104. This boss 106 defines a lock cylinder (not separately designated) within which a conventional lock plug 110 is accommodated. The lock plug is shown as of the plate tumbler type, its key slot being accessible at the top of the cap and being shielded by a pivoted dust cover 111. The details of the cylinder, plug and dust cover form no part of my present invention and are subject to variation as desired. The lock plug 110 is rotatably secured in the cylinder in any suitable manner, as by a detent plate 113 and is provided with integral non-concentric lugs 112 projecting downwardly from its lower end into holes 114 in a cup-shaped cam 116.

The cam 116 is provided with a flat, bottom portion 118 extending beneath the boss 106, and with a substantially cylindrical portion 120 extending upwardly around and rotatable with respect to the boss 106. At its upper rim, the cylindrical portion 120 carries two diametrically opposed radially extending bolt actuating cam lobes 122 and 124, and an integral stop portion 126 which limits the angular rotation of the cam 116 and the lock plug 110.

The cam 116 is retained in position by a retaining member 128 having a central cup-shaped portion somewhat larger than and nested around the cam 116, the cup-shaped portion of the retaining member consisting of a flat bottom portion 130 and a cylindrical wall 132. From the rim of the cylindrical wall 132 an integral upper flat portion 134 extends outwardly to a position near but spaced from the skirt 108, where it is provided with an integral downturned cylindrical skirt 136 concentric with the skirt 108 of the cap body. The retaining member 128 is rigidly positioned with respect to the cap body 104 by a pair of screws 138 which extend through suitable holes (undesignated) in the upper flat portion 134 into suitably tapped bosses 140 which may be cast integrally with and project downwardly within the cap body 104. When so secured in position, the central cup-shaped portion of the retaining member 128 is concentric with but slightly spaced from the cupped portion of the cam 116, and the skirt 136 is concentric with but spaced from the skirt 108. The cam 116 is provided with an axially positioned downwardly extending bearing boss 142 which projects into an axial bearing hole 144 in the flat bottom portion 130 of the retainer. A bowed leaf spring 145 is also provided between the flat bottom portions 118 and 130 of the cam and the retaining member, urging the cam upwardly and preventing rattling.

The internal diameter of the retainer skirt 136 is such as to clear but to fit relatively closely around the periphery of the outturned flange 146 of a filler neck 102, of the type the cap is intended to fit. The flanges of such filler necks are also customarily provided with diametrically opposed, inwardly extending notches, such as the notches 150 and 152 illustrated, to provide clearance for downwardly and inwardly return-bent holding fingers which are provided on conventional non-locking caps, and which act like bayonet lock means to removably hold such non-locking caps by cooperation with inclined depending skirt-like walls 154, on the periphery of the filler neck flange 146. My improved locking cap mechanism according to this second embodiment of the invention does not coact with these inclined skirt-like walls 154, but with the outturned, or flat neck flange 146 in the areas of the notches 150 and 152. The skirt 136 of the retaining member carries a pair of diametrically opposed lugs 155, which are rigidly affixed to its lower edge, and which project inwardly far enough so that the space between them is less than the maximum diameter of the filler neck flange 146 except in the areas of the notches 150 and 152. The lugs 155 are proportioned, and positioned, to fit the notches 150 and 152, so that the cap can only be applied to the filler neck by orienting it so the lugs 155 pass through the notches 150 and 152. Directly above each of the lugs 155, there is a vertical slot 156 extending entirely through the skirt 136 and also extending radially inwardly part way through the flat upper portion 134 of the retaining member.

A pair of latch bolts 158 are provided, each having a supporting portion 162 retained between the top of the cap and the flat upper portion 134 of the retaining member, and radially slidable therebetween. Each one of the bolts 158 has a downwardly extending arm 161 movable through the slot 156, and an inwardly and upwardly turned terminal holding portion 160 adapted to underlie the outturned flange 146 of the filler neck in one of the notched areas to hold the cap in position, as shown in Fig. 8. The slots 150 and 152 extend inwardly only about half the radial distance of the flange 146, and when the bolts are moved outwardly to their released positions shown in Fig. 11, the hooked retaining portions 160 thereof, although still extending part way into the notch, clear the flange in the notched area, so that the cap can be removed.

As shown in Figs. 8 and 11, the supporting portion 162 of each bolt extends inwardly directly over and in slidable engagement with the flat upper portion 134 of the retaining member. At its inner extremity, the supporting portion 162 of each bolt is provided with an upturned lug 164 which extends into and substantially fills the cross section of a radially extending partly cylindrical slot 165 formed in the undersurface of the top of the cap body. The upper surface of the supporting portion 162 of each latch bolt 158 is also provided with a partly cylindrical slot 166 which coacts with the slot 165 to enclose a helical compression spring 168, which bears outwardly against the flat outer wall 170 of the slot 165 and urges the latch bolt 158 radially inwardly toward its latched position.

The upper extremity, or rim portion of the cam 116 projects into the space between the lugs 164 and the wall of the boss 106 so that when the cam 116 is turned by means of the lock plug, the cam lobes 122 and 124 may bear outwardly against the lugs 164 to move the latch bolts 158 outwardly to their released positions. The areas of the rim of the cam 116, between the lobes 122 and 124, which engage the lugs 164 when the bolts are in their latched position, may be flattened, as indicated at 129, as well as reduced in diameter, so that the springs 168 tend to turn the cam 116 and the lock plug to the latched position, as well as to project the bolts inwardly into holding underengagement with the filler neck flange.

The limits of angular travel of the actuating cam 116 and the lock plug are defined by an arm 126, which may be cast integrally with the rim of the cam 116. This arm 126 bears against a corner 167 of a bolt guideway wall 169 formed in the cap body 104 when the cam reaches its fully latched position, as shown in full lines in Fig. 9, and against an integral stop lug 172 depending interiorly from the top of the cap body, when the cam reaches its released position, as shown in broken lines.

The inner ends of the holding portions 160 of the bolts 158 may be inclined as indicated at 180, so that the latch bolts 158 are cammed outwardly when the cap is forced downwardly into position on the filler neck. Thus the key is not required in order to attach the cap.

The lugs 155 carried by the retainer skirt 136 project inwardly below the latch bolts, and to positions relatively close to the filler neck. The retainer skirt 136 is provided at its lower extremity with an integral, outwardly extending flange 182 which projects substantially to engagement with the inner wall of the body skirt 108. The flange 182 is not interrupted in the areas of the slots 156, and such flange, and the lugs 155, accordingly shield the latch bolts and effectively prevent unauthorized manipulation thereof from the outside by anyone attempting to pick the lock.

The gasket-spring element of this embodiment will be recognized as operating upon similar principles to those which are involved in the operation of the gasket-spring element of the first embodiment described above. It may similarly be constructed of relatively resilient and elastic material, molded in a single piece, and includes a supporting sleeve portion 174 which fits over and is retained upon the cylindrical wall 132 of the retaining member, a snap ring 177 being provided to assist in the retention of the gasket-spring element. A downward and outwardly flaring integral conical portion 176 projects from a position near the upper end of the sleeve section 174 and carries at its periphery an integral thickened rim portion 175. In this embodiment the conical portion is shown as of uniform thickness, and the rim portion 175 is thickened both axially and radially, and is provided with a flat bottom adapted to bear downwardly against the upper end of the filler neck. When the cap is urged downwardly into locked position on the filler neck, the gasket-spring element is distorted from the relaxed condition shown in Fig. 11 to the condition shown in Fig. 8. Again it will be appreciated that this action tends to cause the cone to flatten and to flare outwardly. The rim portion 175 tends to confine the cone, however, as in the first embodiment, and to resist such outward flaring. In this embodiment, inasmuch as the cone portion 176 is somewhat weaker, and the rim somewhat stiffer, than in the first embodiment, the cone portion is not sufficiently resistant to inward distortion to cause the rim to stretch materially, although it does, of course, exert an outward stretching effect upon the rim. As brought out in Fig. 8, the resistance to stretching of the rim is so great, however, that it tends to impart to the conical portion 176 a distortion in the nature of an annular wave, although it will be appreciated that this effort to compress the conical portion necessarily induces a certain amount of stretching of the rim, and that the relative amounts of stretching, of diaphragm-like bending, and bellowslike or wavular distortion can be controlled by varying the proportioning of the parts and the durometer rating of the rubber employed. Again it will be appreciated that the resistance to distortion increases near the end of the travel, but that a relatively long and smooth action is provided, despite which, when the cap is fully applied, as shown in Fig. 8, the axial dimensioning consumed by the gasket-spring element is slight, so that its presence does not necessitate lengthening the cap in an axial direction. The rim portion, in this embodiment, need not project radially beyond the filler neck, and it thus presents no interference with the depending latch bolt portions 158.

It is common to provide an air vent for the tank by deforming a portion of the filler neck, including the flange 146, in the area of one of the previously mentioned slots 150 and 152, as best shown in Fig. 10. In the construction illustrated, a generally V-shaped depression 185 is provided in the filler neck flange 146, such depression being centered with respect to the slot 150. The upwardly hooked retaining portions 160 of the latch bolts are centrally relieved by the formation of notch-like, cut-out, or kerfed areas 186 therein. Thus, in whichever of the two diametrically reversed positions the cap is applied to the filler neck, the kerfed area of one of the bolts will straddle the depressed flange portion which defines the notch 185, to properly secure the cap.

What is claimed is:

1. In combination with a fuel tank filler neck cap or the like having a central plug portion which normally extends partly into the filler neck when the cap is in place thereon, and an outer skirt portion which extends down over and around the filler neck when the cap is so placed, a unitary, resilient gasket comprising a radially inner supporting portion fitted on the plug portion of the cap, a radially outer elastic reinforcing ring portion, and a resilient, elastic, generally conical portion integral with and joining said supporting portion and said ring portion, said gasket being arranged so that when the cap is placed on the filler neck the end wall of the filler neck engages said gasket outwardly of said inner supporting portion and tends to flatten said conical portion, said ring portion being effective to increase the resistance of said conical portion to such flattening.

2. In combination with a fuel tank filler neck cap or the like having a central plug portion which normally extends partly into the filler neck when the cap is in place thereon, and an outer skirt portion which extends down over and around the filler neck when the cap is so placed, a unitary, resilient gasket comprising a radially inner supporting portion fitted on the plug portion of the cap, a radially outer elastic reinforcing ring portion, and a resilient, elastic, conical portion extending between and joined to said supporting and ring portions, said ring portion serving to increase the resistance of said conical portion to being widened and flattened by axial forces applied to the cone near its base in a direction toward its apex, and thereby to increase the over-all resilience of said gasket so that it resiliently biases the cap away from the filler neck.

3. A latching cap for a fuel tank filler neck or the like of the type having a radial flange, said cap comprising a body having an outer skirt portion and an inner plug portion, said skirt portion being shaped to extend around said filler neck, said plug portion being shaped to extend partially within said filler neck, said cap also including a unitary, resilient gasket having an inner supporting portion supported by said plug portion, an outer elastic reinforcing ring portion disposed close to but radially inwardly spaced from said skirt portion, and a resilient, elastic, conical portion extending between and joining said supporting and ring portions, said conical portion being sufficiently resistant to compressive forces directed from its base toward its apex in its conic plane to apply radial stretching force to said ring portion when an axial force is applied to an annular area near the base of the conic portion in a direction parallel to the axis of the cone and toward the apex, whereby the conic portion tends to expand and to stretch said ring portion, and said ring portion then reacts to effectively increase the resistance of said conical portion to expansion and to urge it back toward its normal unexpanded shape.

4. A latching cap for a fuel tank filler neck or the like of the type having an inwardly extending flange, said cap comprising a body having an outer skirt portion and an inner plug portion, said skirt portion being shaped to extend around said filler neck, said plug portion being shaped to extend partially within said filler neck, said cap also including a unitary, resilient gasket having an inner sleeve portion fitted snugly around and supported by said plug portion, an outer reinforcing ring portion, and a resilient, elastic, conical portion extending between said sleeve and ring portions, the inner diameter of said ring portion being greater than the diameter of said filler neck and smaller than the inside diameter of said skirt portion, said ring portion extending downwardly from said conical portion and surrounding said filler neck when the cap is positioned thereon, said conical portion engaging said filler neck and being axially deflected from its normal position when said cap is latched upon said filler neck, said ring portion serving to increase the elasticity of said conical portion when it is thus deflected.

5. In combination with a fuel tank filler neck cap or the like having a central plug portion which normally extends partly into the filler neck when the cap is in place thereon, and an outer skirt portion which extends down over and around the filler neck when the cap is so placed, a unitary sealing and biasing gasket structure comprising a resilient generally radially outwardly extending conical portion having an inner holding portion fitted on the plug portion of the cap, said conical portion having an annular inner surface area radially and axially outspaced from said holding portion and adapted to seat against the end wall of a fuel tank filler neck or the like whereby the conical portion may be outwardly expansively stretched in a direction tending to enlarge the angle of the cone defined by said conical portion when said annular area is pressed against the filler neck by pressure in an axial direction applied to said holding portion when the cap is placed upon the filler neck, and an integral outer ring portion spaced radially outwardly from said annular area, said ring portion being tensioned by the conical portion when the latter is so expansively stretched, whereby the ring portion tends to place the conical portion in compression and to return the cone to a steeper form.

References Cited in the file of this patent

UNITED STATES PATENTS 2,749,156     Cliborn _____ June 5, 1956